United States Patent

Poirier et al.

[11] 4,054,908
[45] Oct. 18, 1977

[54] VIDEOTELEPHONE CONFERENCE SYSTEM

[76] Inventors: Alain M. Poirier, 82, rue de la Republique, Meudon, France, 92190; Georges Buchner, 63, rue de Pixerecourt, Paris, France, 75020; Gilbert François Martel, 1, rue du Sergent Blandan, Issy-les-Moulineaux, France, 92130

[21] Appl. No.: 689,179

[22] Filed: May 24, 1976

[30] Foreign Application Priority Data

May 27, 1975 France .................. 75.16471

[51] Int. Cl.² .................. H04N 7/18; H04N 7/14
[52] U.S. Cl. .................. 358/85; 179/2 TS
[58] Field of Search .................. 358/84, 85, 86; 179/2 TV, 1 CN, 2 TS

[56] References Cited

U.S. PATENT DOCUMENTS

| | | | |
|---|---|---|---|
| 3,519,744 | 7/1970 | Dorros et al. | 179/2 TS |
| 3,601,530 | 8/1971 | Edson et al. | 358/85 |

FOREIGN PATENT DOCUMENTS

| | | | |
|---|---|---|---|
| 46-21481 | 6/1971 | Japan | 179/2 TS |

*Primary Examiner*—Robert L. Richardson

[57] ABSTRACT

Video conference system connecting a plurality of remotely located conference rooms, each containing a group of conferees. It comprises in each room a plurality of videotelephones respectively assigned to the conferees, each including a camera and an image receiver and a plurality of microphones respectively associated with these videotelephones. Means are provided for comparing the levels of the speech signals generated by said microphones in each room and registering an address signal defining the videotelephone associated with the microphone generating the loudest speech signal. Means are further provided for adding all the signals generated by the microphones in each room and thereby obtaining room cumulated microphone signals, the levels of which are compared and an address signal defining the room whose microphones generate the loudest cumulated signal is registered. The rooms are connected through transmitting and receiving video facilities. Switching means selectively connects the cameras of the videotelephones of a room to the image receivers thereof and to said video signal transmitting and receiving video facilities and a switch logic controls said switching means and is itself controlled by the videotelephone address signals and the room address signals.

4 Claims, 11 Drawing Figures

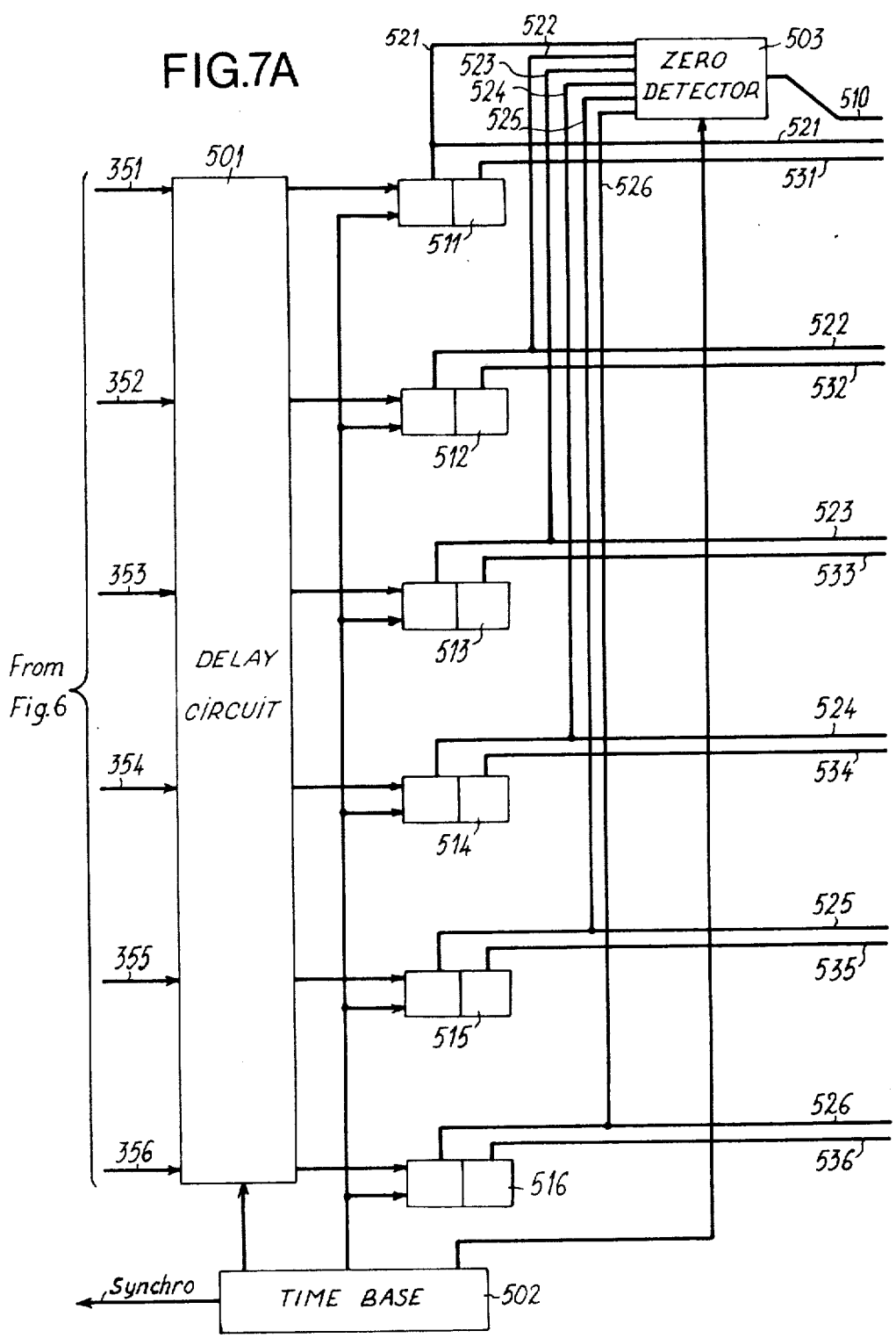

VIDEOTELEPHONE CONFERENCE SYSTEM

BACKGROUND OF THE INVENTION

This invention relates to a video conference system connecting at least two groups of remote conferees divided in sub-groups each containing a small number of conferees and provided with an individual videotelephone and more particularly a video conference system utilizing voice controlled switching to automatically direct the field of view of the camera of a particular videotelephone toward the image receivers of the other videotelephones.

Video conference systems utilizing voice controlled switching are known in the prior art. U.S. Pat. No. 3,601,530 issued Aug. 24, 1971 disclosed a system in which at at least two locations, a plurality of video cameras are used and the field of each is restricted to a relatively small number of people who can be seen well enough to provide good visual contact. Voice voting and switching are used to determine the location of the person in the group who is talking and in response thereto, the appropriate camera is enabled so that the talker will be seen at the remote location. To this end, a plurality of microphones, equal in number to the videotelephones are positioned before a group and these microphones are respectively associated with the videotelephones. The address of the person who is speaking is determined by the level of speech signals generated in each of the microphones. In response to the loudest speech signal, a comparison circuit causes the camera of the videotelephone associated with the microphone generating the loudest speech signal to be enabled. It is the video image of this camera that is transmitted to the remote location along with the audio signal. As different people in the group speak, in turn, the appropriate cameras covering the same are successively enabled so that the outgoing video provides a good visual image of the person when talking. A corresponding operation takes place at the other location, i.e., the video conferencing is two-way.

In this prior art conference system, a conferee in the local conference room or station sees on his assigned image receiver the incoming video image sent by the camera assigned to a talker located in a remote conference room. He also sees the outgoing video sent from the local station to the remote one on a centrally disposed image receiver. But the viewer does not see on his assigned image receiver the talker when the viewer and talker are in the same conference room.

The primary object of the present invention is to establish a visual telephone conference network in which all the videotelephones of the network are treated identically irrespective of the conference room in which they are located.

A related object of the invention is to provide a voice controlled visual telephone conference network with two voice voting stages : a talker group voice voting stage and a talker voice voting stage.

SUMMARY OF THE INVENTION

In accordance with the present invention, two groups of remotely located conferees are connected therebetween by a two-way video channel or more than two groups of remotely located conferees are connected by two way video channels to a video conference switching network. At each location, a videotelephone together with an associated microphone is assigned to a small number of conferees, say one or two. The levels of the speech signals generated in each of the microphones are compared in a talker voice comparator stage so as to determine the address in the group of the microphones generating the loudest speech signal. At each station, all the speech signals of the station are added and averaged so as to produce a cumulated speech signal. The energies of the cumulated speech signals are compared in a talker group voice comparator stage so as to determine the address of the group generating the largest cumulated speech signal. A switching network controlled by the two stage comparator enables the camera of the videotelephone associated with the microphone generating the loudest speech signal in the group whose microphones generate the loudest cumulated speech signal.

BRIEF DESCRIPTION OF THE DRAWING

The invention will be more fully appreciated from the following detailed description when considered in connection with the accompanying drawings in which:

FIGS. 7A and 7B show the address registers and the switch control logic;

DESCRIPTION OF THE PREFERRED EMBODIMENTS

Figure 1:
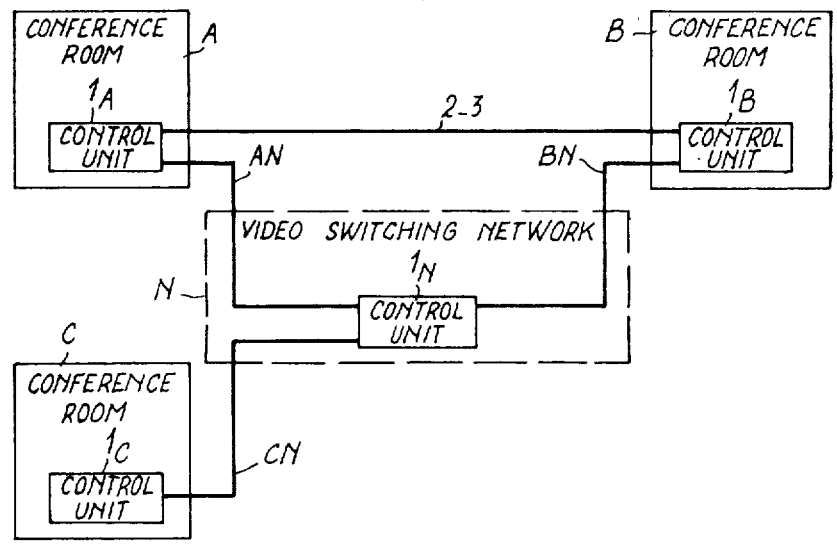
FIG. 1 is a schematic block diagram of conference rooms provided with videotelephones and control unit and connected through audio and video channels either therebetween or to a video switching network.
Figure 2:
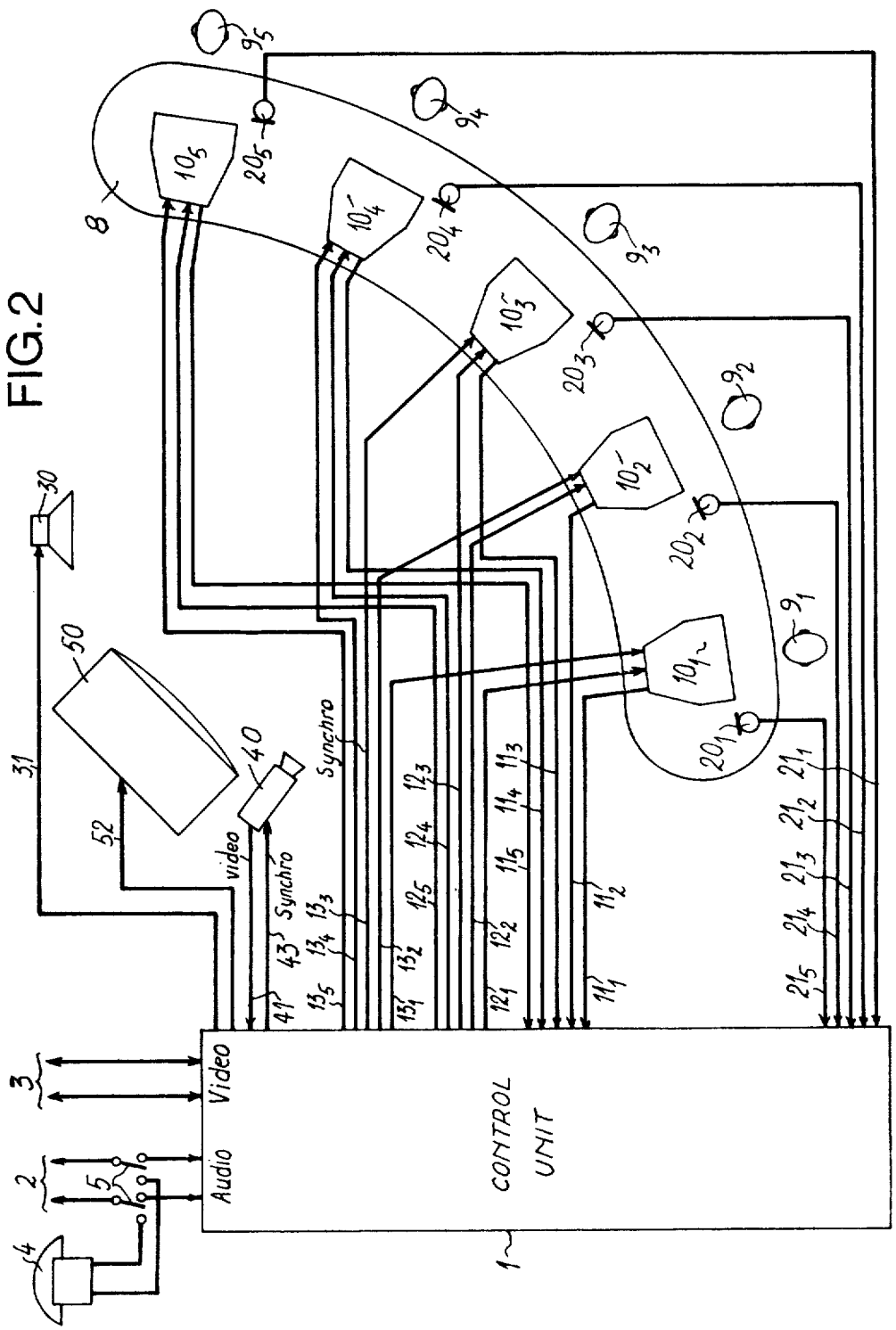
FIG. 2 shows the interior of a conference room furnished with videotelephones, microphones, loudspeakers, a wide angle lens camera and a large screen image receiver and comprising in or close to the room a control unit.

Referring first to FIG. 1, it shows a plurality of conference rooms or stations A, B, C containing therein furniture, components and apparatuses disclosed in relation to FIG. 2 and connected either therebetween or to a video switching network N through one-way audio channels and two-way video channels 2-3, AN, BN, CN. Each station and the switching network further comprise a control unit respectively $1_A$, $1_B$, $1_C$, $1_N$ for the purpose of selecting a particular videotelephone in the station and selectively dispatching the image generated by the camera of the selected videotelephone to the other stations. The video switching network N is used only for more than two groups of remote conferees.

A typical terminal or conference location is schematically shown in plan in FIG. 2. Variations, particularly in the physical arrangement, will be evident hereinafter and hence it should be clear that the principles of the invention are in no way limited to the arrangement illustrated. For example, a table 8, of a nondescript nature, is shown to have five chairs $9_1$-$9_5$ disposed along its length — one chair per conferee. A second set of chairs can, if necessary, be placed directly near or behind chairs $9_1$-$9_5$. On table 8 and in front of each chair $9_1$-$9_5$ is placed a videotelephone, respectively $10_1$-$10_5$, and a microphone, respectively $20_1$-$10_5$. As known, each videotelephone includes a camera and an image receiver. A loudspeaker 30 is conveniently disposed in the conference room; for example, it can hang down from the ceiling in a known manner. Location of the loudspeaker should be such that acoustic coupling to the microphones is minimized. A wide angle lens camera 40 is provided so that it takes in its field the whole group of conferees; this camera is designated hereinafter as the "overview" camera. A large screen image receiver 50 is centrally disposed with respect to the group of conferees so as to be seen by all the members of the group.

The cameras and image receivers of the videotelephones $10_1$-$10_5$ and the microphones $20_1$-$20_5$ are connected to the control unit 1 respectively by lines $11_1$-$11_5$, $12_1$-$12_5$ and $21_1$-$21_5$. Lines $11_1$-$11_5$ and $12_1$-$12_5$ are video lines having a bandwidth of say 1 MHz. Loudspeaker 30, overview camera 40 and large screen image receiver 50 are connected to the control unit 1 respectively by lines 31, 41 and 52. Control unit 1 provides videotelephones $10_1$-$10_5$ and overview camera 40 with synchro signals through respectively leads $13_1$-$13_5$ and 43.

Control unit 1 is connected through a telephone line 2 and a video line 3 to a remote conference room identical with that represented in FIG. 2.

When the video conference system is not in operation, line 2 is connected through switch 5 to a telephone set 4. To bring the video conference system to operation, switch 5 is positioned so as to connect line 2 to control unit 1.

Figure 3:
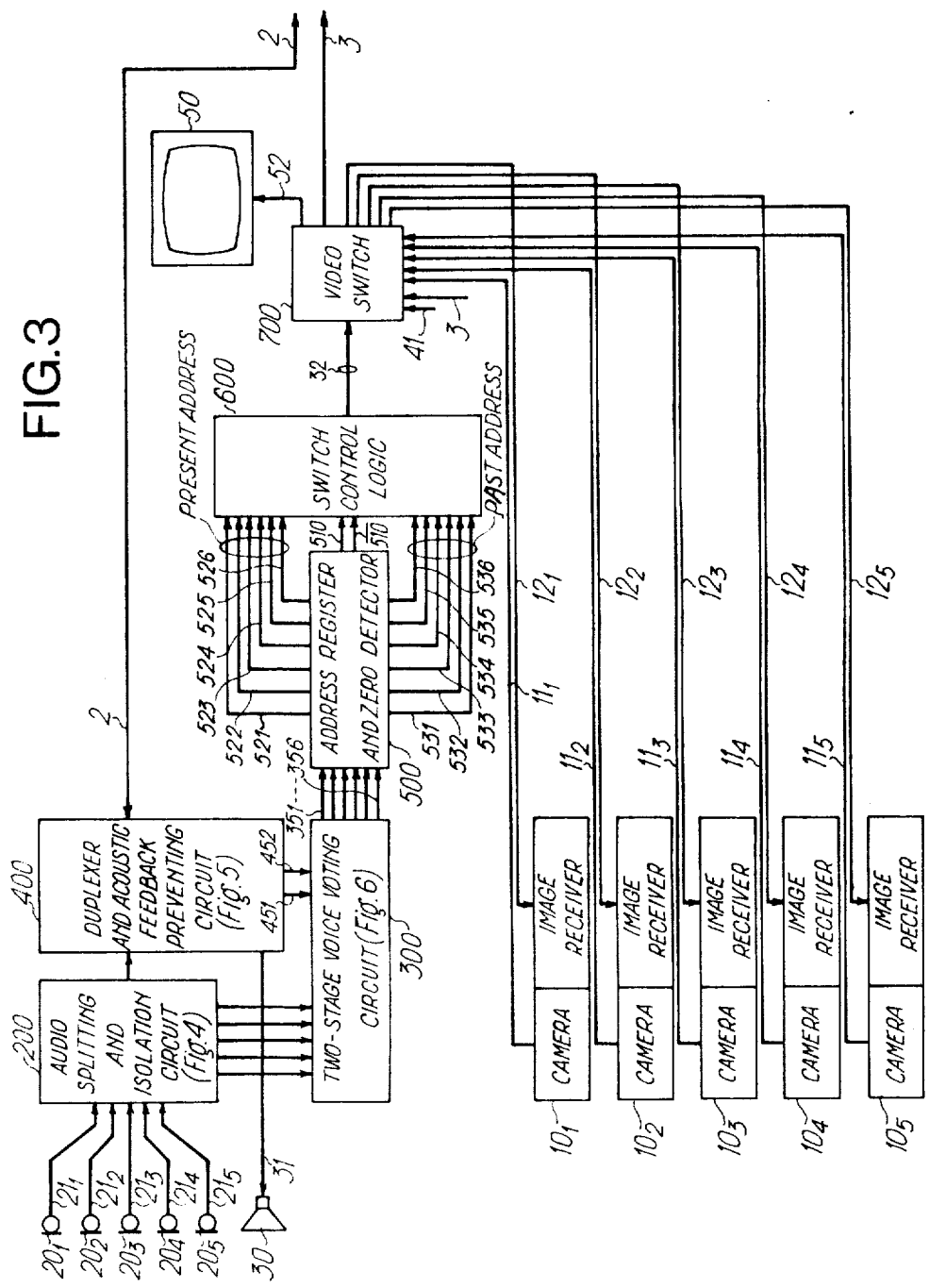
FIG. 3 is a block diagram of the control unit located in each conference room.

Turning now to FIG. 3, which represents in block diagram form the control unit 1, the microphones $20_1$-$20_5$ are connected through leads $21_1$-$21_5$ to an audio splitting and isolation network 200 of conventional structure. This network transmits the individual microphone signals to the two stage voice voting circuit 300 and an averaged cumulated microphone signal to the duplexer and acoustic feedback preventing circuit 400. Circuit 400 has an output terminal connected to loudspeaker 30 through lead 31 and a two-way terminal connected to audio line 2. It also transmists to voice voting circuit 300 the level of the incoming cumulated microphone signal and the level of the outgoing cumulated microphone signal.

If n is the number of microphones in the conference room, the voice voting circuit has $(n+2)$ inputs and $(n+1)$ outputs. It gives a signal on one among these outputs. The $n+1$ outputs of voice voting circuit 300 are linked to address register and zero detector 500. This circuit determines the address of the conferee presently talking and memorizes this address. It is connected to switch control logic 600 which controls video switch 700. The input signals to video switch 700 originate from the cameras of videotelephones $10_1$-$10_5$ and from the reception end of video line 3 and the output signals from video switch 700 terminate at the image receivers of the videotelephones and at the transmission end of video line 3.

Figure 4:
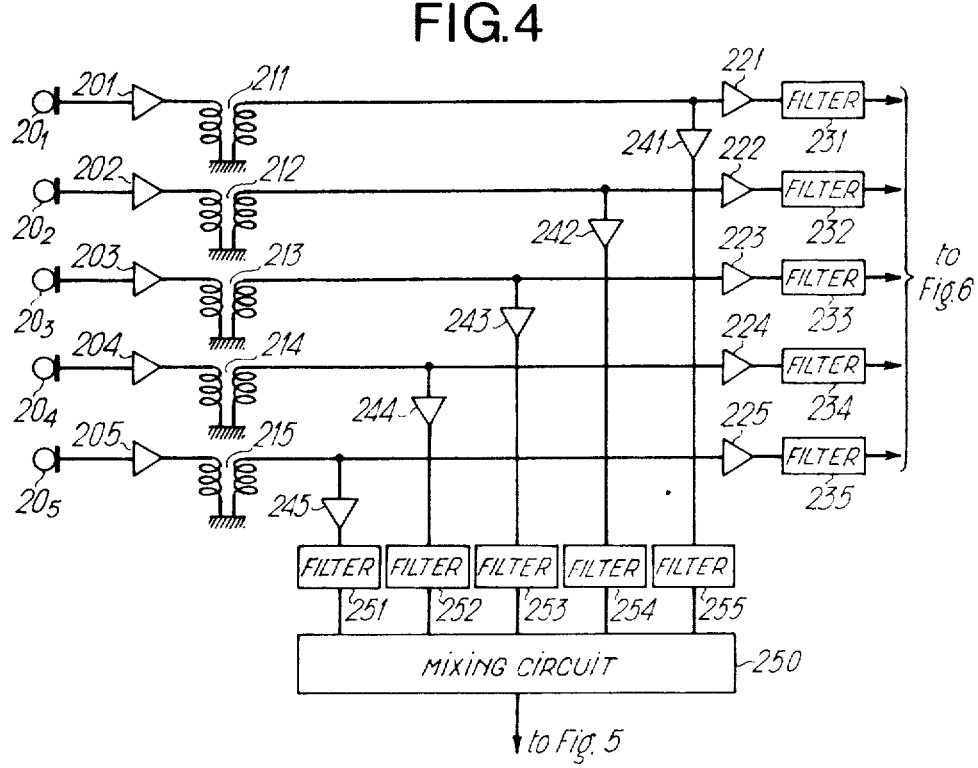
FIG. 4 shows a detailed diagram of the audio splitting and isolation network.

FIG. 4 represents the audio splitting and isolation circuit. It is entirely prior art. The output signals of microphones $20_1$-$20_5$ are coupled via preamplifiers 201-205, impedance matching transformers 211-215 and buffer amplifiers 221-225 to band-pass filters 231-235. The microphone signals are also applied via buffer amplifiers 241-245 and band-pass filters 251-255 to a mixing circuit 250.

Figure 5:
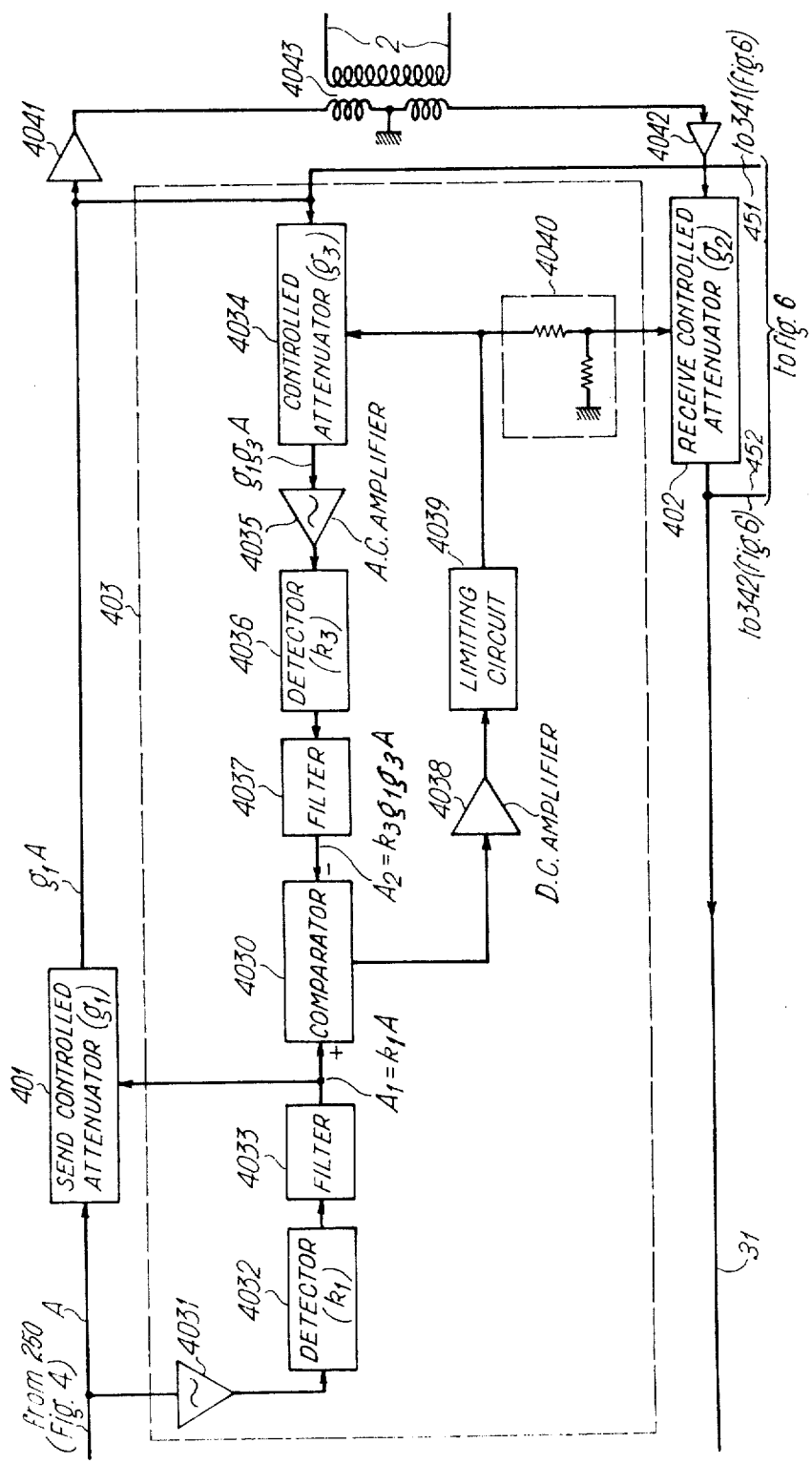
FIG. 5 shows a detailed diagram of the duplexer and acoustic feedback preventing circuit.

Duplexer and acoustic feedback preventing circuit 400 is shown in FIG. 5. It comprises a send controlled attenuator 401, a receive controlled attenuator 402 and a control circuit 403 for said attenuators. Control circuit 403 has two inputs respectively connected to the input and output of attenuator 401 and two outputs respectively connected to the control terminal of attenuators 401 and 402. Control circuit 403 comprises a voltage comparator 4030, whose two inputs are connected to the input and output of attenuator 401 through upstream and downstream chains of circuits. The upstream circuit chain comprises an A.C. amplifier 4031, a detector 4032 and a band-pass filter 4033 whose output is connected both to the first input of comparator 4030 and to the control terminal of attenuator 401. The downstream circuit chain comprises a controlled attenuator 4034, an A.C. amplifier 4035, a detector 4036 and a band-pass filter 4037 whose output is connected to the second input of comparator 4030.

The output of comparator 4030 is connected through a D.C. amplifier 4038 and a limiting circuit 4039 to the control terminal of attenuator 4034 and through circuits 4037-4038 and fixed attenuator 4040 to controlled attenuator 402.

Attenuator 401 is connected to send amplifier 4041 and to the first winding of hybrid transformer 4043. The second winding of this transformer is connected to receive amplifier 4042 and to attenuator 402. The third winding is connected to the audio channel towards the other conference room.

The arrangement of FIG. 5 has the property that the product of the attenuation factors $g_1$, $g_2$, $g_3$ the attenuation factors of attenuators 401, 402, 4034. At the output of 401, the signal amplitude is $g_1$ A. At the output of 4034, the signal is $g_1 g_3$ A. The signal $A_1$ detected by 4032 is $k_1$ A; the signal $A_2$ detected by 4036 is $K_3 g_1$, $g_3$ A. When the two signals applied to comparator 4030 are equal, one has:

$K_1 A$ $k_3 g_1 g_3 A$ ($k_1$, $k_3$, constants)

whereby
$g_1 g_3 =$ constant

Due to fixed attenuator 4040, $g_2$ is proportional to $g_3$. Therefore $g_1 g_2 =$ constant.

Figure 6:
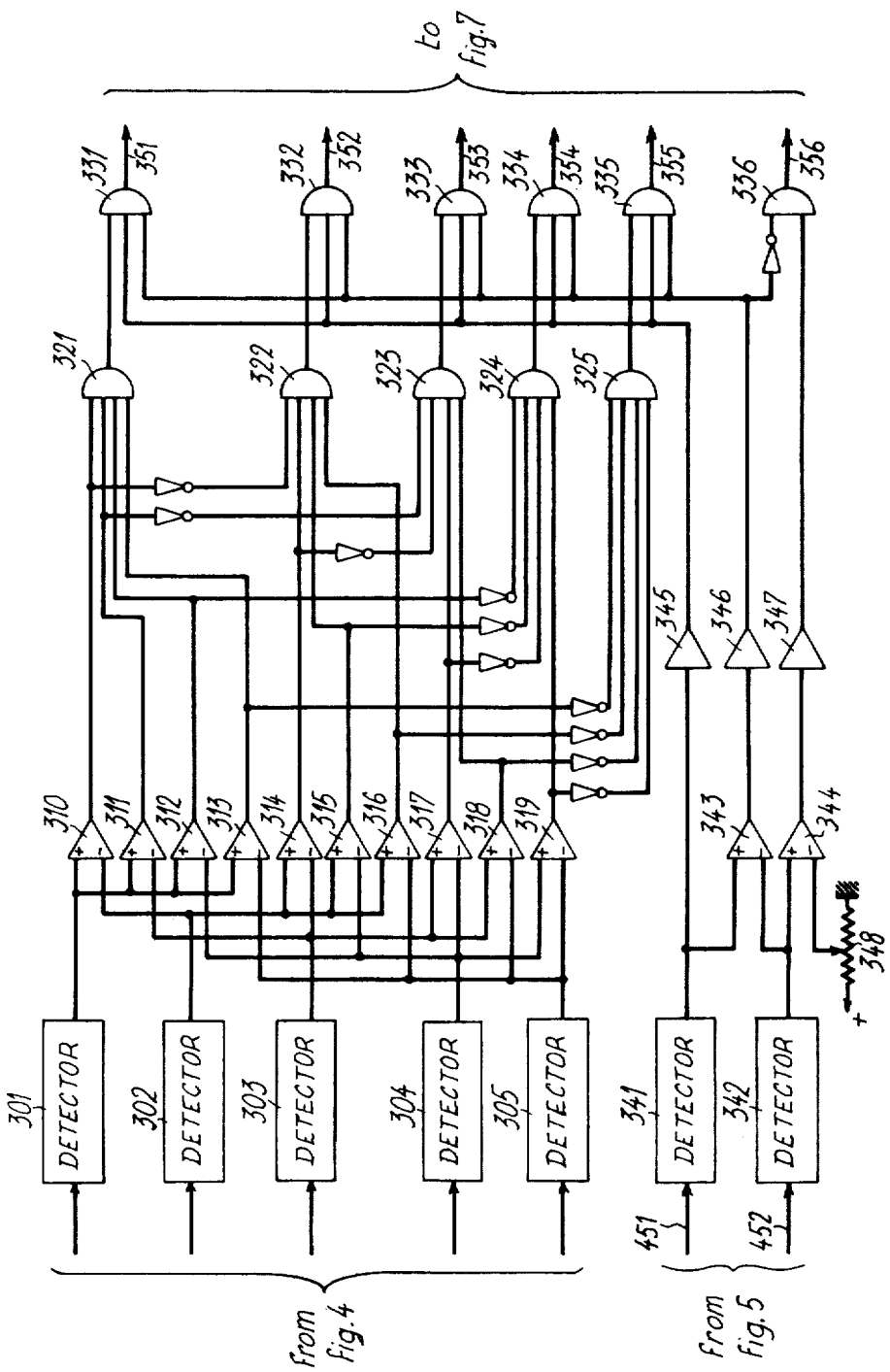
FIG. 6 shows a detailed diagram of the two stage voting circuit.

FIG. 6 shows the two-stage voice voting circuit 300. It comprises five input terminals connected to the five output terminals of circuit 200. Each input is connected to a detector, respectively 301-305 and to one or several differential amplifiers arranged to make the comparison between the signals of every pair of input signals. Since five input signals are concerned, there are $C_5^2 = 10$ differential amplifiers 310-319. The outputs of differential amplifiers 310-319 are connected to five AND-gates 321-325 according to the following pattern:

the outputs of 310-313 are connected to AND-gate 321;

the outputs of 314-316 and the inverted output of 310 are connected to AND-gate 322;

the outputs of 317-318 and the inverted outputs of 311 and 314 are connected to AND-gate 323;

the outputs of 319 and the inverted outputs of 312, 315 and 317 are connected to AND-gate 324;

the inverted outputs of 313, 316, 318 and 319 are connected to AND-gate 325.

According to whether the largest detected microphone signal originates from microphones $20_1$ to $20_5$, a signal is produced at the output of AND-gates 321 to 325. The outputs of the AND-gates 321–325 forming the first stage of the voting circuit are connected to an input of AND-gates 331–335, forming the second stage of the voting circuit.

This second stage comprises two detectors 341 and 342 respectively connected at the output of send controlled attenuator 401 and at the output of receive controlled attenuator 402. The signals appearing at the outputs of detectors 341, 342 are the local cumulated microphone signal and the remote cumulated microphone signal. These signals are applied to a comparator 343 and the remote cumulated microphone signal is also applied to another comparator 344, the second input of which receives a predetermined voltage by means of a potentiometer 348. The outputs of comparators 343 and 344 and the output of detector 341 are connected to analog-to-digital interface circuits 345, 346, 347. The outputs of circuits 345 and 346 are connected to the other inputs of AND-gates 331–335. Further the inverted output of circuit 346 and the output of circuit 347 are applied to an AND-gate 336.

From the arrangement of FIG. 6, it results that a one bit appears at the output of one of the AND-gates 331–335 only when the local cumulated microphone signal is larger than the remote cumulated microphone signal. If instead the local cumulated microphone signal is smaller than the remote cumulated microphone signal and if the latter signal is also greater than a predetermined level, a one bit appears at the output of AND-gate 336.

A delay circuit 501 is connected to the outputs of AND-gates 331–336. As shown in FIG. 7A, it is formed by six counters which are initiated by the bits appearing at their inputs and counts up to a given number clock pulses generated by a time base 502 and then produce an output pulse. These pulses are applied to six shift registers 511–516 each having two stages of flipflops controlled by time base 502. The contents of the first stages of the registers are transferred into the second stages each time that the contents of the first stage change. In this way, the bit in the first stage is the address of the person now talking. A one bit in one of leads 521–525 gives the selected talker's address in a "1 out of 5" code. A zero or a one in lead 526 indicated that the selected talker is respectively in the local or in the remote conference room. If he is in the local room, his address is that indicated by the address register of the local control unit. If he is in the remote room, his address is that indicated by the address register of the remote control unit.

The address in the second stage of the register is the address of the past speaker.

Leads 521–525 are connected to a zero detector 503 which gives an output signal when the contents of the address register 511–515 is zero during a predetermined period, say 10 seconds and simultaneously the output of flipflop 516 is a one. When this condition occurs, the image picked by the overview camera is transmitted toward the remote large screen image receiver.

Figure 8:
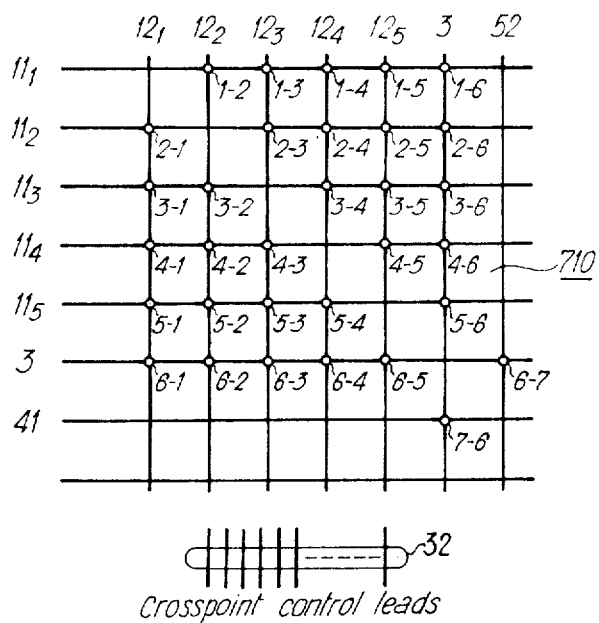
FIG. 8 shows in detail the video switching network.

Referring now to FIG. 8 which represents the video switch, five input leads $11_1$ to $11_5$, video reception line 3 and overview camera line 41 are connected to the rows of a crosspoint matrix 710. The columns of the crosspoint matrix are connected to five output leads $12_1$ to $12_5$, video transmission line 3 and in large size image receiver line 52.

Taking into account that each conferee must receive the image of the present speaker, except the present speaker who receives the image of the past speaker, the crosspoints must be distributed as follows:

Each incoming line $11_1$ to $11_5$ is switchable to (i) all the outgoing lines $12_1 - 12_5$ except to the line having the same subscript as the incoming line and (ii) video transmission line 3.

The video reception line 3 is switchable to (i) the outgoing lines $12_1 - 12_5$ and (ii) image receiver line 52.

The overview camera line 41 is switchable to video transmission line 3.

Consequently, there are 32 crosspoints in matrix 710 and 32 control wires. Variations in the number of matrix lines, matrix columns and crosspoints will be evident for those skilled in the art and hence it should be clear that the principles of the invention are in no way limited to the arrangement illustrated in FIG. 8.

Figure 7B:
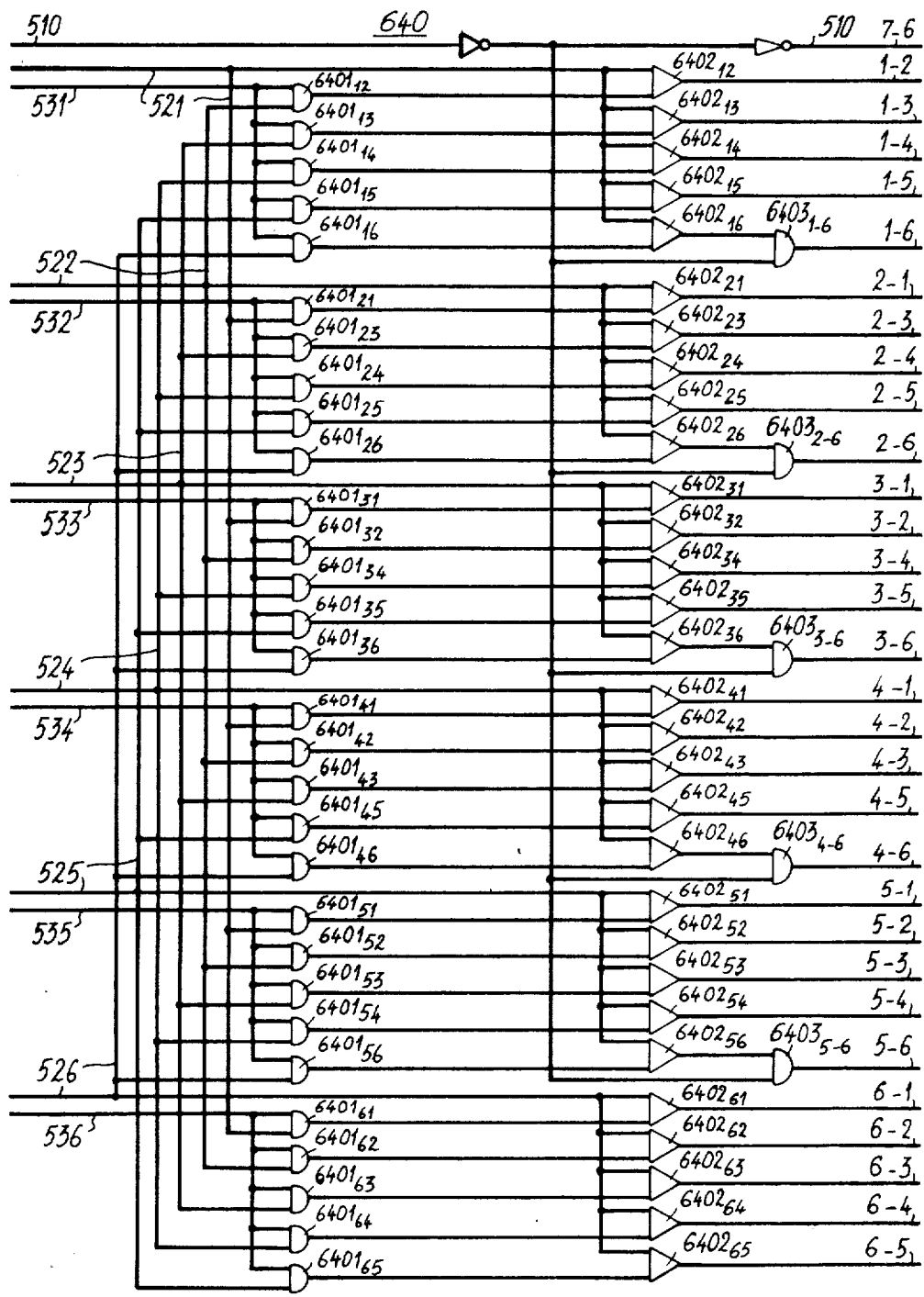

The lines 521–526 (FIG. 7A) conveying the address of the present speaker, the lines 531–536 conveying the address of the past speaker and the lines 510 and $\overline{510}$ transmitting a silence a "non-silence" signal are connected to a switch control circuit 640 as represented in FIG. 7B. This switch control circuit controls the crosspoints of the matrix 710, these crosspoints being designated by the number $i$ of the line ($1 \leq i \leq 7$) and the number $j$ of the column ($1 \leq j \leq 7$) separated by a hyphen. The matrix 710 has no diagonal crosspoints. The crosspoints ($i$-$j$) with $i = j$ and $1 \leq i \leq 6$ and $j \leq 5$ are controlled by the Boolean equation :

$$52i + (53i \times 52j) = 1 \tag{1}$$

where $52i$ is one of the numbers 521 to 526 inclusive and $53i$ is one of the numbers 531 to 535.

Line 521 is connected to OR-gates $6402_{12}$, $6402_{13}$, $6402_{14}$, $6402_{15}$, $6402_{16}$ Line 522 is connected to OR-gates $6402_{21}$, $6402_{23}$, $6402_{24}$, $6402_{25}$, $6402_{26}$ Line 523 is connected to OR-gates $6402_{31}$, $6402_{32}$, $6402_{34}$, $6402_{35}$, $6402_{36}$ Line 524 is connected to OR-gates $6402_{41}$, $6402_{42}$, $6402_{43}$, $6402_{45}$, $6402_{46}$ Line 525 is connected to OR-gates $6402_{51}$, $6402_{52}$, $6402_{53}$, $6402_{54}$, $6402_{56}$ Line 526 is connected to OR-gates $6402_{61}$, $6402_{62}$, $6402_{63}$, $6402_{64}$, $6402_{65}$ Line 531 is connected to AND-gates $6401_{12}$, $6401_{13}$, $6401_{14}$, $6401_{15}$, $6401_{15}$, $6401_{16}$ the second input of said AND-gates being respectively connected to leads 522, 523, 524, 525, 526, Line 532 is connected to AND-gates $6401_{21}$, $6401_{23}$, $6401_{24}$, $6401_{25}$, $6401_{26}$ the second inputs of said AND-gates being respectively connected to leads 521, 523, 524, 525, 526, Line 533 is connected to AND-gates $6401_{31}$, $6401_{32}$, $6401_{34}$, $6401_{35}$, $6401_{36}$ the second inputs of said AND-gates being respectively connected to leads 521, 522, 524, 525, 526, Line 534 is connected to AND-gates $6401_{41}$, $6401_{42}$, $6401_{43}$, $6401_{45}$, $6401_{46}$ the second inputs of said AND-gates being respectively connected to leads 521, 522, 523, 525, 526, Line 535 is connected to AND-gates $6401_{51}$, $6401_{52}$, $6401_{53}$, $6401_{54}$, $6401_{56}$ the second inputs of said AND-gates being respectively connected to leads 521, 522, 523, 524, 526, Line 536 is connected to AND-gates $6401_{61}$, $6401_{62}$, $6401_{63}$, $6401_{64}$, $6401_{65}$ the second inputs of said AND-gates being respectively connected to leads 521, 522, 523, 524, 525.

The crosspoints (i-6) are controlled by the Boolean equation:

$$[52i + 53i \times 526] \overline{510} = 1 \qquad (2)$$

which signifies that, except after a silence of a predetermined duration, the image conveyed by outgoing video line 3 originates from the camera of one of the videotelephones $10_1$ to $10_5$. Consequently; OR-gates $6402_{16}$, $6402_{26}$, $6402_{36}$, $6402_{46}$, $6402_{56}$ are followed respectively by AND-gates $6403_{16}$, $6403_{26}$, $6403_{36}$, $6403_{46}$, $6403_{56}$, these latter AND-gates receiving also the signal on line $\overline{510}$.

Crosspoint (7–6) is controlled by the signal on line 510.

Crosspoint (6–7) is permanently passing.

Figure 9:
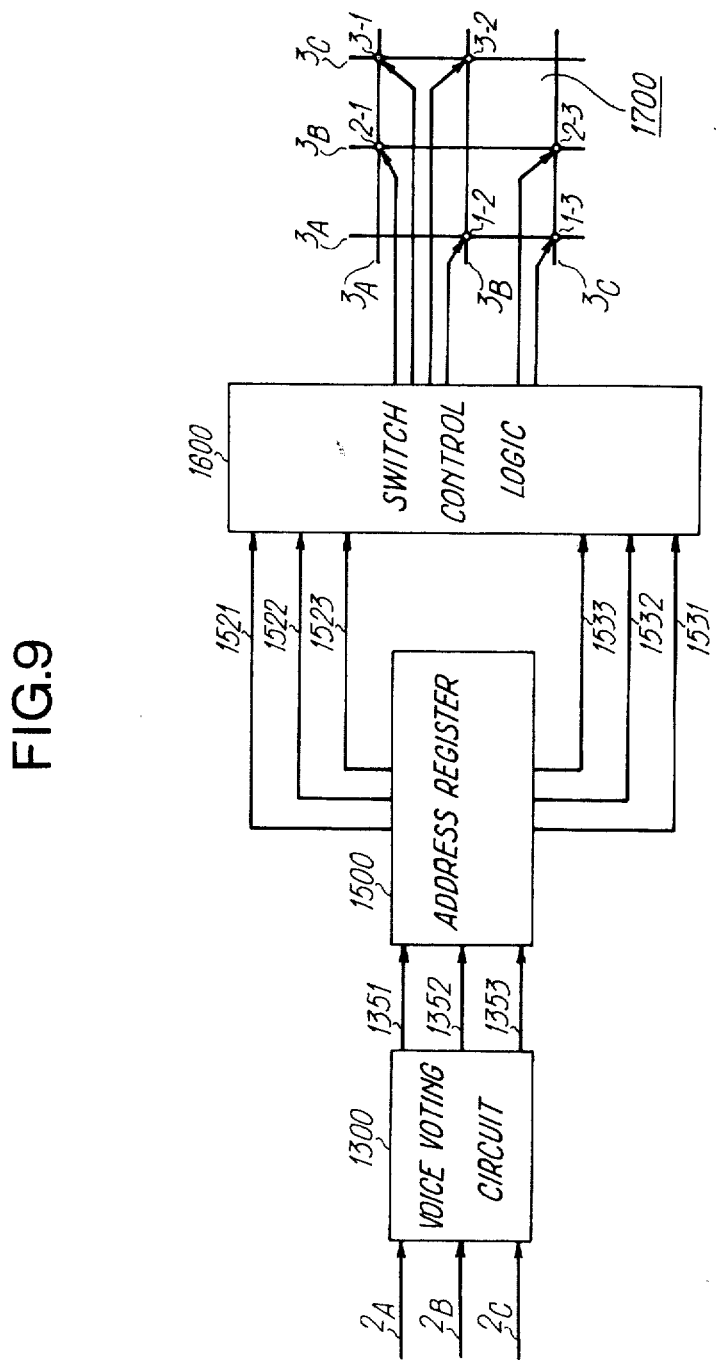
FIG. 9 represents the video switching network which is necessary in the case where there are more than two conference rooms.

FIG. 9 shows the control unit $1_N$ in the video switching network N when the number of groups of remote conferees in greater than 2. In this case, the comparison between the cumulated microphone signals which in the two groups case was made at both ends of the video line is now made in a special control unit $1_N$.

Lines $2_A$, $2_B$, $2_C$ are the audio lines originating from conference rooms A, B and C of FIG. 1 and transmitting the cumulated microphone signals. They are similar to line 2 of FIG. 3. These lines are connected to a voice voting circuit 1300 which generates a signal on one among three output lines 1351, 1352, 1353. Lines 1351-1353 are connected to a two-stage address register 1500 which gives on lines 1521-1523 the address of the group containing the present speaker and on lines 1531-1533 the address of the group containing the past speaker. The address register controls the switch control logic 1600 and this control logic controls the video switch 1700.

Video switch 1700 has only three input rows and three output columns $3_A$, $3_B$, $3_C$ and six crosspoints. These crosspoints are controlled in the same way as the crosspoints of FIG. 8. If the present largest cumulated microphone signal originates from a given station, station A for example, crosspoints 1-2 and 1-3 of matrix 1700 are operated. If further the past largest cumulated microphone signal originated from station B, crosspoint 2-1 is operated.

In the stations A, B and C, leads 451–452 and comparator 343 are omitted. Crosspoints 6-1 to 6-5 are permanently passing.

Figure 10:
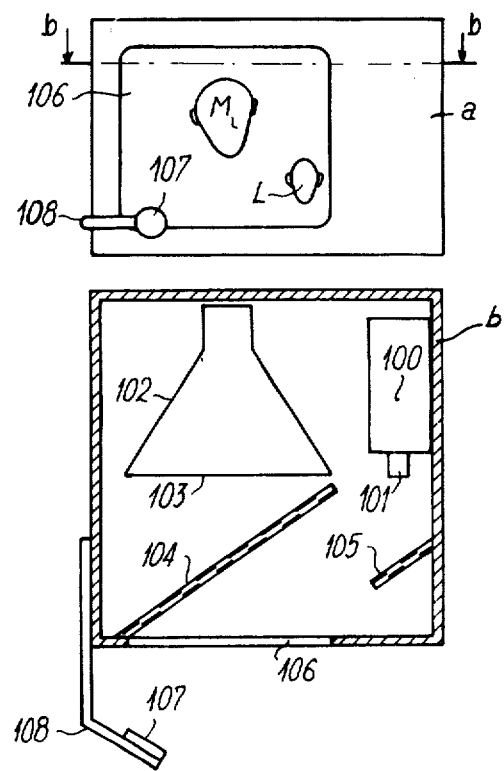
FIG. 10 represents a videotelephone set advantageously usable in the system of the invention.

We shall now, with reference to FIG. 10, give a brief description of the optical circuit of a model of videotelephone to which may be used with particular advantage in the device according to the invention.

View a is a front view and view b is a diagrammatic section along plane b—b of view a. The electric connections are not shown.

The axes of lens 101 of camera 100 and of screen 103 of image receiver 102 are parallel in the same horizontal plane. The observer is seen from lens 101 by reflection on an oblique semireflecting plate 104 and on reflector 105. The observer sees screen 103 via window 106 and through plate 104. As already mentioned, the observer has the impression of looking into the eyes of the speaker whose image is displayed, since the optical system has no parallax. Owing to the absence of parallax, a convex rearview device 107 can be disposed in front of window 106, device 107 being secured to the videotelephone casing by a holder 108. Device 107 is disposed and oriented so that it does not block the observer's visual field and so that it sends a reduced imag of screen 103 to the periphery of the camera field. The rear-view device added to each videotelephone makes it possible for a speaker L, as shown in view a, to see the image of a preceding speaker M at the same time as his own reduced-scale image at the periphery of the screen; it is also possible for the other participants to see a reduced image of M together with a normal-sized image of L in their own videotelephones.

Of courses, the videotelephone comprises known circuits (not shown) for varying the brightness and contrast of the receiver screen, and a control box. It also in known manner comprises an optical mirror system for photographing horizontal documents.

What we claim is:

1. A video conference system connecting a plurality of remotely located conference rooms, each containing a group of conferees, comprising a plurality of videotelephones in each room assigned to the conferees in said room and each comprising a camera and an image receiver, a plurality of microphones respectively associated with the videotelephones, means for comparing the levels of the speech signals generated by said microphones in each room and registering the address of the videotelephone associated with the microphone geneating the loudest speech signal, means for mixing all the speech signals generated by the microphones in each room and thereby obtaining room mixed speech signals, means for comparing the levels of the mixed speech signals of the rooms and registering the address of the room whose microphones generate the loudest mixed speech signals, means for transmitting video signals from each conference room to the other, video switching means for selectively connecting the cameras of the videotelephones or each room to the image receiver of said room and to said video signal transmitting means and means controlled by the videotelephone address register means and the room address register means for generating control signals for said switching means in response to said loudest speech signal and said loudest mixed speech signal.

2. A video conference system connecting a plurality of remotely located conference rooms, each containing a group of conferees, comprising a plurality of videotelephones in each room assigned to the conferees in said room and each comprising a camera and an image receiver, a plurality of microphones respectively associated with the videotelephones, means for comparing the levels of the speech signals generated by said microphones in each room and registering the present address of the videotelephone associated with the microphone generating the loudest speech signal, means for memorizing said present videotelephone address when a microphone associated with another videotelephone generates a louder speech signal, said memorized videotelephone address being the past address of the videotelephone associated with the microphone generating the loudest speech signal, means for mixing all the speech signals generated by the microphones in each room and thereby obtaining room mixed speech signals, means for comparing the levels of the mixed speech signals of the rooms and registering the present address of the room whose microphones generate the loudest mixed speech signal, means for memorizing said present room address when the microphones of a room generate a louder mixed speech signal, said memorized room address being the past address of the room whose microphones generate the loudest mixed speech signal, means for transmitting video signals from each conference room to the other, video switching means for selectively connecting the cameras of the videotelephones of each room to the image receivers of said room and to said video signal transmitting means and means controlled by the videotelephone present and past addresses and the room present and past addresses, for generating control signals for said switching means in response to the present and last loudest speech signals and the present and last loudest mixed speech signals.

3. A video conference system connecting a plurality of remotely located conference rooms, each containing a group of conferees, comprising:
  a. a plurality of videotelephones in each room assigned to the conferees in said room and each comprising a camera and an image receiver;
  b. a plurality of microphones respectively associated with the videotelephones;
  c. means for comparing the levels of the speech signals generated by said microphones in each room and registering a videotelephone address signal defining the videotelephone associated with the microphone generating the loudest speech signal;
  d. means for mixing all the signals generated by the microphones in each room and thereby obtaining room mixed speech signals;
  e. means for comparing the levels of the mixed speech signals of the rooms and registering a room address signal defining the room whose microphones generate the loudest mixed speech signal;
  f. means for transmitting and receiving video signals to and from each conference room from and to the other one;
  g. a plurality of video switching means a first group of which selectively connects the camera of each videotelephone of each room to the image receivers of the other videotelephones of said room and a second group of which selectively connects the video signal receiving means to the image receivers of the videotelephones of said room and the cameras of the videotelephones of said room to the video signal transmitting means, each video switching means being under control of a signal applied to its control input;
  h. means for generating control signals for said first group of video switching means in response to said videotelephone address signals and for said second group of video switching means in response to said room address signals.

4. A video conference system connecting a plurality of remotely located conference rooms, each containing a group of conferees, comprising:
  a. a plurality of videotelephones in each room assigned to the conferees in said room and each comprising a camera and an image receiver;
  b. a plurality of microphones respectively associated with the videotelephones;
  c. a television monitor means;
  d. an overview camera;
  e. means for comparing the levels of the speech signals generated by said microphones in each room and registering a videotelephone address signal defining the videotelephone associated with the microphone generating the loudest speech signal;
  f. means for mixing all the signals generated by the microphones in each room and thereby obtaining room mixed speech signals;
  g. means for comparing the levels of the mixed speech signals of the rooms and registering a room address signal defining the room whose microphones generate the loudest mixed speech signal;
  h. means for detecting the absence during a predetermined period of all the videotelephone address signals and room address signals and generating a control signal when said absence lasts at least said period;
  i. means for transmitting and receiving video signals to and from each conference room from and to the other one;
  j. a plurality of video switching means a first group of which selectively connects the camera of each videotelephone of each room to the image receivers of the other videotelephones of said room, a second group of which selectively connects the video signal receiving means to the image receivers of the videotelephones of said room and the cameras of the videotelephones of said room to the video signal transmitting means, and a third group of which selectively connects the overview camera of said room and the television monitor means of said room to said video signal transmitting and receiving means, each video switching means being under control of a signal applied to its control input; and
  k. means for generating control signals for said first group of video switching means in response to said videotelephone address signals, for said second group of video switching means in response to said room address signals, and for third group of video switching means in response to said control signal generated by said detecting means.

* * * * *